(12) United States Patent
Murakami et al.

(10) Patent No.: US 7,591,209 B2
(45) Date of Patent: *Sep. 22, 2009

(54) VIBRATION SUPPRESSING CUTTING TOOL

(75) Inventors: Daisuke Murakami, Hyogo (JP);
Masanobu Ueda, Hyogo (JP);
Kazuhiko Kashima, Hyogo (JP); Junya Okida, Hyogo (JP); Norihide Kimura, Hyogo (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 188 days.

This patent is subject to a terminal disclaimer.

(21) Appl. No.: 10/580,553

(22) PCT Filed: Nov. 26, 2004

(86) PCT No.: PCT/JP2004/017604
§ 371 (c)(1),
(2), (4) Date: May 26, 2006

(87) PCT Pub. No.: WO2005/051582
PCT Pub. Date: Jun. 9, 2005

(65) Prior Publication Data
US 2007/0089574 A1 Apr. 26, 2007

(30) Foreign Application Priority Data
Nov. 26, 2003 (JP) .............................. 2003-395827
Sep. 15, 2004 (JP) .............................. 2004-268812

(51) Int. Cl.
*B23B 27/00* (2006.01)
*B23B 29/02* (2006.01)

(52) U.S. Cl. ........................................ 82/158; 408/143

(58) Field of Classification Search .................. 82/158, 82/904, 163; 409/141; 408/143; 267/137
See application file for complete search history.

(56) References Cited

U.S. PATENT DOCUMENTS 2,426,359 A    8/1947   Lankheet
2,563,559 A *  8/1951   Sneva (Continued)

FOREIGN PATENT DOCUMENTS

EP        0 812 641 A1    12/1997

(Continued)

OTHER PUBLICATIONS

European Search Report issued in European Patent Application No. EP 04 25 3326, dated Dec. 13, 2004.

*Primary Examiner*—Boyer D Ashley
*Assistant Examiner*—Sara Addisu
(74) *Attorney, Agent, or Firm*—McDermott Will & Emery LLP

(57) ABSTRACT

An object is to provide a vibration suppressing cutting tool which is inexpensive and can damp chattering extremely effectively, and which is simple in structure and is applicable to a wide variety of machining diameters and cutting conditions.

The shank 2 of the holder 1 is formed with a pocket 4. In the pocket 4, a vibration suppressing piece 5 is received so as to be movable relative to the holder 1 and not protrudable from the pocket 4. Under kinetic energy from the holder during cutting, the vibration suppressing piece 5 alternately knocks against a pair of opposed inner wall surfaces 4a and 4b of the pocket along its surface, along a plurality of lines or on a plurality of points when the holder vibrates during cutting, thereby damping vibrations of the holder.

12 Claims, 17 Drawing Sheets

U.S. PATENT DOCUMENTS

| | | | |
|---|---|---|---|
| 2,641,940 A * | 6/1953 | White | |
| 2,656,742 A * | 10/1953 | Poole | 408/143 |
| 2,699,696 A | 1/1955 | Hahn | |
| 2,842,014 A * | 7/1958 | Miller | |
| 3,207,009 A * | 9/1965 | Carlstedt | 408/143 |
| 3,642,378 A * | 2/1972 | Hahn et al. | |
| 3,663,116 A * | 5/1972 | Muller et al. | 408/143 |
| 3,774,730 A * | 11/1973 | Maddux | 188/379 |
| 3,838,936 A * | 10/1974 | Andreassen et al. | 408/143 |
| 3,923,414 A * | 12/1975 | Hopkins | 408/143 |
| 4,061,438 A * | 12/1977 | New | 408/143 |
| 4,553,884 A * | 11/1985 | Fitzgerald et al. | |
| 5,170,103 A * | 12/1992 | Rouch et al. | 318/128 |
| 5,518,347 A * | 5/1996 | Cobb, Jr. | 409/141 |
| 5,700,116 A * | 12/1997 | Cobb, Jr. | 409/141 |
| 6,443,673 B1 * | 9/2002 | Etling et al. | |
| 6,619,165 B2 * | 9/2003 | Perkowski | |
| 6,929,431 B2 * | 8/2005 | Bergholt et al. | |
| 7,234,379 B2 * | 6/2007 | Claesson et al. | |
| 2002/0036091 A1 * | 3/2002 | Claesson et al. | |
| 2002/0083805 A1 * | 7/2002 | Lundblad | |
| 2003/0147707 A1 | 8/2003 | Perkowski | |
| 2005/0109182 A1 * | 5/2005 | Murakami et al. | |

FOREIGN PATENT DOCUMENTS

| | | | |
|---|---|---|---|
| JP | 59-129602 | | 7/1984 |
| JP | 62292306 A | * | 12/1987 |
| JP | 5-228707 A | | 9/1993 |
| JP | 6-31505 A | | 2/1994 |
| JP | 6-31507 A | | 2/1994 |
| JP | 06179103 A | * | 6/1994 |
| JP | 2979823 | | 9/1999 |
| JP | 2001-62612 A | | 3/2001 |
| JP | 2001-96403 A | | 4/2001 |
| JP | 2001-328022 A | | 11/2001 |
| JP | 2003-62703 A | | 3/2003 |
| JP | 2003-62735 A | | 3/2003 |
| JP | 2003-136301 A | | 5/2003 |
| WO | WO 02/20202 A1 | | 3/2002 |
| WO | WO 02/45892 A1 | | 6/2002 |

* cited by examiner

Direction of vibration

Direction of vibration

Fig. 10

| | A | B | C | D |
|---|---|---|---|---|
| X-X sectional shape | | | | |
| Amount of deflection based on 100 of steel shank | 140 | 109 | 135 | 135 |

Fig. 11

| | Shape of pocket | | | Weight | |
|---|---|---|---|---|---|
| | w (mm) | h (mm) | h-a (mm) | Material | Specific gravity |
| Example 1 of the invention | 8 | 3 | 0.1 | Cemented carbide | 15.1 |
| Example 2 of the invention | 8 | 3 | 0.05 | Cemented carbide | 15.1 |
| Example 3 of the invention | 8 | 3 | 0.15 | Heavy metal | 18.2 |
| Example 4 of the invention | 8 | 3 | 0.15 | Steel | 7.8 |
| Example 5 of the invention | 8 | 3 | 0.3 | Cemented carbide | 15.1 |
| Example 6 of the invention | 8 | 3 | 0.5 | Cemented carbide | 15.1 |
| Comparative Example 1 | 4 | 3 | 0.15 | Cemented carbide | 15.1 |
| Comparative Example 2 | 8 | 3 | 0 | Cemented carbide | 15.1 |
| Comparative Example 3 | 8 | 3 | 1.5 | Cemented carbide | 15.1 |
| Comparative Example 4 | Holder with steel shank | | | | |
| Comparative Example 5 | Holder with shank of cemented carbide | | | | |

Fig. 12

| Protrusion mm | 48 | | 60 | | 72 | | 84 | |
|---|---|---|---|---|---|---|---|---|
| Cutting speed m/min | 80 | 160 | 80 | 160 | 80 | 160 | 80 | 160 |
| Example 1 of the invention | O | O | O | O | O | O | O | O |
| Example 2 of the invention | O | O | O | O | O | × | × | × |
| Example 3 of the invention | O | O | O | O | O | O | O | O |
| Example 4 of the invention | O | O | O | O | O | × | × | × |
| Example 5 of the invention | O | O | O | O | O | O | O | O |
| Example 6 of the invention | O | O | O | O | O | O | × | × |
| Comparative Example 1 | O | O | × | × | × | × | × | × |
| Comparative Example 2 | O | O | × | × | × | × | × | × |
| Comparative Example 3 | O | × | × | × | × | × | × | × |
| Comparative Example 4 | O | O | × | × | × | × | × | × |
| Comparative Example 5 | O | O | O | O | O | × | × | × |

Fig. 13

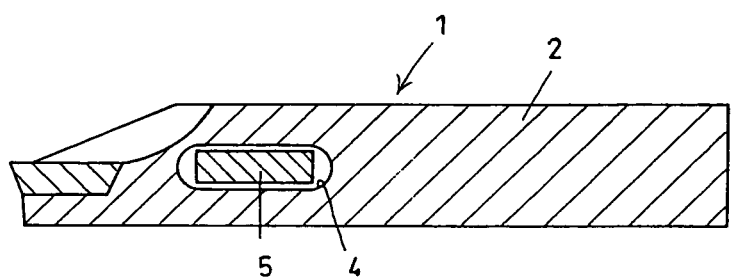

Fig.21

|  | Size of pocket | | Result of cutting | |
|---|---|---|---|---|
|  | Width (mm) | Height (mm) | Cutting conditions 1 | Cutting conditions 2 |
| Example 1 of the invention | 5 | 5 | ○ | ○ |
| Example 2 of the invention | 8 | 7 | ○ | ○ |
| Comparative Example 1 | 3 | 3 | × | × |
| Comparative Example 2 | 12 | 4 | ○ | × |
| Comparative Example 3 | Steel shank | | × | × |

Fig. 25
|  | Size of pocket | | Result of cutting | |
| --- | --- | --- | --- | --- |
|  | Width (mm) | Height (mm) | Cutting conditions 1 | Cutting conditions 2 |
| Example 1 of the invention | 20 | 13 | ◯ | ◯ |
| Example 2 of the invention | 15 | 10 | ◯ | ◯ |
| Comparative Example 1 | 20 | 20 | × | × |
| Comparative Example 2 | 20 | 8 | ◯ | × |
| Comparative Example 3 | 10 | 10 | ◯ | × |
| Comparative Example 4 | Steel shank | | × | × |
Fig. 26(a)
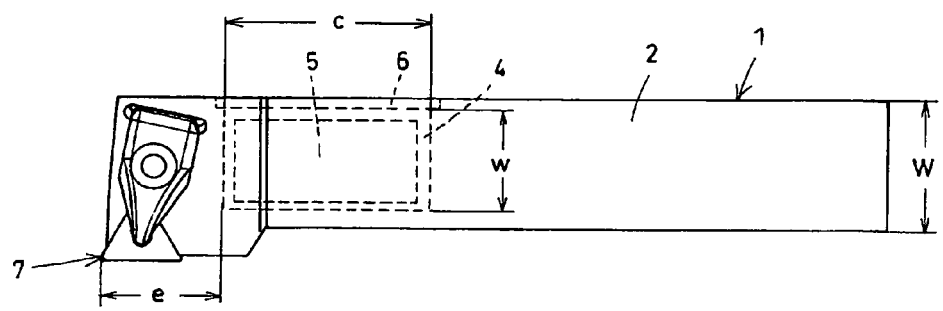
Fig. 26(b)
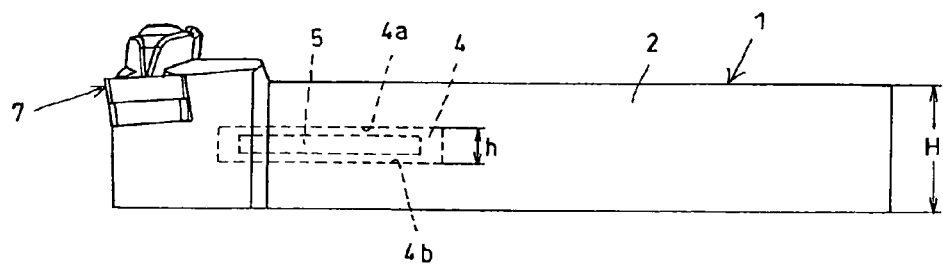

Fig.27(a)
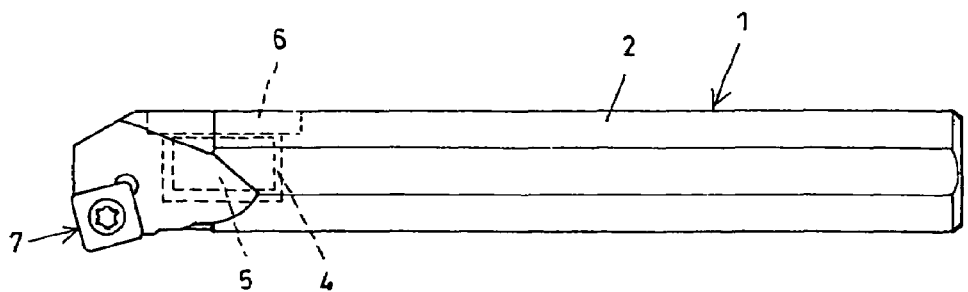
Fig.27(b)
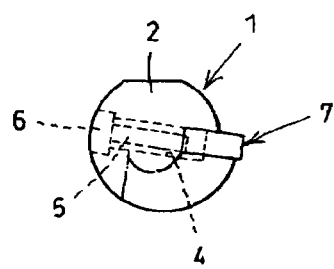
Fig.28
|  | Size of pocket | | Number of impacts until breakage |
|---|---|---|---|
|  | Width (mm) | Height (mm) |  |
| Example 1 of the invention | 22 | 3 | 1950 |
| Example 2 of the invention | 14 | 5 | 1800 |
| Comparative Example 1 | 22 | 1.2 | 550 |
| Comparative Example 2 | 22 | 10 | 640 |
| Comparative Example 3 | Steel shank | | 600 |

…

VIBRATION SUPPRESSING CUTTING TOOL

RELATED APPLICATIONS

This application is the U.S. National Phase under 35 U.S.C. § 371 of International Application No. PCT/JP2004/017604, filed on Nov. 26, 2004, which in turn claims the benefit of Japanese Application No. 2003-395827, filed on Nov. 26, 2003, and Japanese Application No. 2004-268812, filed on Sep. 15, 2004, the disclosures of which Applications are incorporated by reference herein.

TECHNICAL FIELD

This invention relates generally to a cutting tool which has to be kept free of mainly chattering, and particularly a vibration suppressing cutting tool which is simple in structure and inexpensive, and which includes means for effectively suppressing chattering.

BACKGROUND ART

It is well-known to mount a damper in the holder to suppress chattering utilizing inertia. Particularly in the case of inner diameter machining boring tools, because the size of the holder is restricted by the bore diameter of the workpiece, its protrusion has to be increased while reducing the diameter of the shank. This increases the possibility of chattering. Thus, many of the conventional vibration suppressing tools are boring tools. The following description is therefore mainly made with reference to boring tools.

For example, in Patent document 1, a method shown in FIG. 5 is disclosed. In this method, a hole 21 is formed in the holder 1 from its rear end, a damper 22 is received in the hole 21 at its front end near the cutting edge, and a core rod 23 is inserted in the hollow portion of the hole. In Patent document 2, a turning tool is disclosed of which the holder is formed with a deep hole in its central portion into which a viscous fluid and a weight are received. In Patent document 3, a cutting tool is disclosed in which a rod spring is inserted in a hole formed in the tool body, a visco-elastic body is disposed between the rod spring and the hole, a cutting head is provided at the front end of the rod spring, and a frictional vibration suppressing material is provided between the cutting head and the tool body.

The cutting tools shown in Patent documents 1 and 2 cancel chattering using the inertia of the damper. The cutting tool disclosed in Patent document 3 reduces vibrations transmitted to the tool body by converting vibration energy to frictional heat.

There are also known a boring bar in which a damper made of a different material from the shank is fitted in a hole formed in the shank using tapered surface to damp vibration utilizing the contact friction between the shank and the damper (see Patent document 4), and tools in which a vibration suppressing member for absorbing vibration energy is mounted in the tool body to damp vibration (Patent publications 5 and 6).

In the vibration suppressing cutting tools of Patent documents 1 to 3, because the damper is inserted in the deep hole formed in the shank, the hole has to be formed by e.g. a gun drill especially if the tool is an inner diameter machining tool, of which the shank is long and small in diameter, so that the machining cost is high. Also, the hole has a large hollow portion through which the damper is inserted. Such a large hollow portion lowers the rigidity of the holder. Further, the structure is complicated, which also pushes up the cost.

Because these holders are complicated in structure, the diameter of the shank is restricted (so that the diameter of the bore that can machined is also restricted in the case of inner diameter machining). This means that in order to sufficiently damp vibration, the cutting conditions are restricted.

The tools disclosed in Patent documents 4 and 5 also have the same problems. Also, in order to absorb vibration energy with the vibration suppressing material, it is necessary that the vibration suppressing material be made of a material having a high vibration suppressing ability, such as an Mn—Cu vibration suppressing alloy. But such alloys are expensive and formability of these alloys is not good, either. Thus, it is difficult to manufacture a tool that is both less costly and of high performance.

For tools using a vibration suppressing material, if the amount of the vibration suppressing material is reduced to reduce the cost, it is difficult to sufficiently damp vibration. If the amount of the vibration suppressing material is increased, the rigidity and strength of the tool tend to be low, which results in increased deflection and reduced durability of the tool.

In the arrangement in which vibration is damped utilizing the contact friction between the shank and the damper, if the friction area is increased in order to increase the vibration suppressing effect, portions that have to be machined increase, thus increasing the cost. If the damper is not in sufficiently close contact with the shank, the rigidity of the tool tends to increase, so that vibration may increase, rather than decrease, during cutting.

Patent document 1: JP patent publication 2003-136301A
Patent document 2: JP patent publication 6-31507A
Patent document 3: JP patent publication 2979823B
Patent document 4: JP patent publication 6-31505A
Patent document 5: JP patent publication 2001-96403A
Patent document 6: JP patent publication 2003-62703A

DISCLOSURE OF THE INVENTION

Object of the Invention

An object of the present invention is to provide a vibration suppressing cutting tool which is free of any of the above-mentioned problems of conventional vibration suppressing cutting tools, which is inexpensive and can damp chattering extremely effectively, and which is simple in structure and is applicable to a wide variety of machining diameters and cutting conditions.

MEANS TO SOLVE THE PROBLEMS

According to the present invention, there is provided a vibration suppressing cutting tool including, as shown in FIGS. 1(a) and 1(b), a holder 1 having a shank 2 formed with a pocket 4 in which a vibration suppressing piece 5 is received so as to be movable relative to the holder 1 and not to be protrudable from the pocket 4. When the holder 1 vibrates during cutting, the inertial force causes the vibration suppressing piece 5 to alternately knock against opposed inner walls of the pocket along surfaces, along a plurality of lines or on a plurality of points, thereby damping the vibration of the holder 1.

Preferably, the pocket is defined by opposed first and second inner wall surfaces formed on the shank of the holder, and the vibration suppressing piece has flat surfaces each adapted to oppose one of the first and second inner wall surfaces of the pockets when received in the pocket. The first and second inner wall surfaces of the pocket and thus the flat surfaces of the vibration suppressing piece are arranged so as to extend perpendicular to the direction of vibrations of the holder expected to be produced during cutting. A clearance is present between the first and second inner wall surfaces and the corresponding flat surfaces of the vibration suppressing piece so that the vibration suppressing piece is movable in the pocket within this clearance.

Instead of the single vibration suppressing piece 5, a plurality of such vibration suppressing piece 5 may be received in the pocket. Also, such a plurality of vibration suppressing pieces 5 may be each received in one of a plurality of separate pockets 5. The vibration suppressing piece 5 may be adapted to knock against the pocket 4 along a plurality of lines or on a plurality of points. But preferably, the former knocks against the latter along as large a surface of the pocket 4 as possible to effectively damp vibrations. For this purpose, the vibration suppressing piece 5 has a rectangular cross-section (section perpendicular to the axis of the shank) such that its surfaces 5a and 5b to be knocked against the first and second inner wall surfaces 4a and 4b of the pocket have greater surface areas than its other opposed surfaces 5c and 5d.

The shape of the vibration suppressing piece 5 as viewed from top of the tool is not particularly limited.

The vibration suppressing piece 5 is preferably made of a material that is larger in specific gravity than the material forming the shank 2. For example, if the shank 2 is made of steel, of which the specific gravity is 7.8, the vibration suppressing piece 5 is preferably made of a cemented carbide or a heavy metal of which the specific gravity is higher than 7.8. The vibration suppressing piece may have a specific gravity equal to or smaller than the shank 2. But if the vibration suppressing piece has a higher specific gravity, it is possible to reduce its size in order to obtain required vibration suppressing capability.

The clearance between the first and second inner wall surfaces 4a and 4b and the vibration suppressing piece 5 is preferably 0.01 to 0.5 mm. The first and second inner wall surfaces 4a and 4b should be arranged so as cross the direction of vibrations of the holder expected to be produced during cutting, preferably at a right angle.

The pocket 4 has a width w which is 20 to 100% of the diameter D or width W of the shank, and a height h which is 5 to 70% of the height H of the shank. The width and height mentioned here and throughout the specification refer to the width and height of a cross-section of the shank.

As shown in FIGS. 2(a) and 2(b), the pocket 4 may be a through hole extending from one to the other side of the shank. In this case, the vibration suppressing piece 5 is sealed in the pocket by e.g. piece retaining means or lids 6.

Alternatively, as shown in FIGS. 3(a) and 3(b), the pocket may be a blind hole formed from one side 1a of the shank which is opposite to the side 1b of the shank where a cutting edge 7a of a cutting insert 7 is located so as to be closed on the side 1b of the shank.

In another alternative embodiment shown in FIGS. 4(a) and 4(b), the shank 2 and the head 3 of the holder are formed separately from each other, the pocket 4 is formed in the front end surface of the shank 2, the vibration suppressing piece 5 is inserted in the pocket 4, and the head 2 is jointed to the front end of the shank to close the opening of the pocket 4.

The pocket 4 of any of these embodiments has an axial length c (see FIG. 1(a)) that is 50 to 250% of the diameter D (i.e. height H) of the shank. The pocket 4 is preferably provided axially offset from the axial center of the tool toward its front end. Specifically, the pocket 4 is preferably located such that the distance e (see FIG. 1(a)) between the cutting edge of the cutting insert and the front end of the pocket is about 50 to 250% of the diameter D of the shank. If the tool is a boring tool, the length c of the pocket is more preferably about 100 to 150% of the diameter D of the shank, the distance e between the cutting edge and the pocket is more preferably about 150 to 220% of the diameter D of the shank, though these preferable values vary with e.g. the cutting conditions.

If the tool is an inner diameter cutting tool such as a boring tool, the pocket 4 has preferably a width w that is 50 to 100% of the diameter D or width W of the shank, and a height h that is 20 to 40% of the height H of the shank, though according to the size of the tool, good results are obtained even if these values are outside the above ranges.

For example, in the case of a boring tool of which the shank has a diameter D exceeding 20 mm, good results were obtained when the pocket 4 had a width w of 0.2D to 0.5D (0.2W to 0.5W) and a height h of 0.2H to 0.5H.

For a tool used to cut hard workpieces such as hardened steel, good results were obtained when the pocket 4 had a width w of 0.5D to 1.0D (0.5W to 1.0W) and a height h of 0.4H to 0.7H.

For a tool of which the pocket had a width w of 0.2D to 1.0D (0.2W to 1.0W) and a height h of 0.05H to 0.2H, chattering was effectively suppressed during high-speed cutting of carbon steel or cutting of stainless steel.

ADVANTAGES OF THE INVENTION

When the holder vibrates, the vibration suppressing piece received in the pocket is vibrated by inertia, thus directly knocking the inner wall of the pocket. At this time, the vibration suppressing piece vibrates in reverse phase to the holder, so that the vibration of the holder is canceled by the vibration of the vibration suppressing piece. Chattering of the holder thus decreases. According to the present invention, the vibration suppressing piece knocks the pocket along its surface, along a plurality of lines, or on a plurality of points. Thus, the load of the vibration suppressing piece disperses to a wide range of the inner wall of the pocket, thus making it possible to substantially suppress chattering.

By orienting the pocket such that its wall surfaces against which the vibration suppressing piece knocks are perpendicular to the direction of vibration of the holder during cutting, energy from the vibration suppressing piece (energy that serves to cancel vibration of the holder) is transmitted to the shank with a minimum loss, so that it is possible to reduce the size of the vibration-piece and the pocket. This minimizes the reduction in the rigidity of the shank due to the presence of the pocket, thus making it possible to more effectively suppress chattering.

According to the present invention, because the pocket can be formed from one side of the holder, the tool can be manufactured easily at a significantly lower cost so that it is possible to provide a less expensive vibration suppressing cutting tool.

In the arrangement in which the holder comprises a shank and a head that are formed separately from each other, and the vibration suppressing piece is inserted in the pocket formed in the shank from the front end of the shank, the vibration suppressing piece can most effectively damp chattering, and there is no need to form a cavity for inserting a damper. Thus, it is possible to simplify the structure of the tool, thereby significantly reducing the cost of the tool, while minimizing the reduction in rigidity of the shank due to the presence of the pocket.

If the vibration suppressing piece is too small and too lightweight, the vibration suppressing effect tends to be insufficient. If the vibration suppressing piece is too large, a larger pocket is necessary, which reduces the rigidity of the shank. Thus, the dimensions of the pocket are preferably within the above-described ranges.

If the length c of the pocket is less than 50% of the diameter D or height H of the shank, the vibration suppressing piece is too small to sufficiently damp vibration. If the length c exceeds 250% of D or H, the rigidity of the shank tends to decrease excessively, so that chattering tends to occur during ordinary cutting, in which the protrusion of the holder (from the support point to the cutting edge) is more than three times the diameter of the shank.

BRIEF DESCRIPTION OF THE DRAWINGS

FIG. 10 is a comparative view of the amount of deformation according to the shape of the pocket;

FIG. 11 is a view showing specifications of tools used in an experiment for confirming effects;

FIG. 12 is a view showing the results of the confirmation experiments of the tools shown in FIG. 11;

FIG. 13 is a view of the tool of FIG. 9 of which the vibration suppressing piece is replaced with a rectangular parallelepiped vibration suppressing piece;

FIG. 21 is a view showing the results of a test for confirming effects of the tool of FIG. 18;

FIG. 25 is a view showing the results of a test for confirming effects of the tool of FIG. 22;

FIG. 26(a) is a plan view of a tool of another embodiment;

FIG. 26(b) is a side view of the tool of FIG. 26(a);

FIG. 27(a) is a plan view of a tool of still another embodiment;

FIG. 27(b) is a side view of the tool of FIG. 27(a);

FIG. 28 is a view showing the results of a test for confirming effects the tool of FIG. 26;

| DESCRIPTION OF NUMERALS | |
|---|---|
| 1 | holder |
| 2 | shank |
| 3 | head |
| 4 | pocket |
| 4a | first inner wall surface |
| 4b | second inner wall surface |
| 5 | vibration suppressing piece |
| 5a-5f | flat surfaces |
| 6 | lid |
| 7 | throwaway insert |
| 8 | clamp means |
| 9 | oil hole |
| 10 | mounting hole |
| 11 | set pin |
| 12 | hole |

BEST MODE FOR EMBODYING THE INVENTION

The vibration suppressing tools according to the embodiments of the present invention are now described with reference to the drawings.

Embodiment 1

Figure 6A:
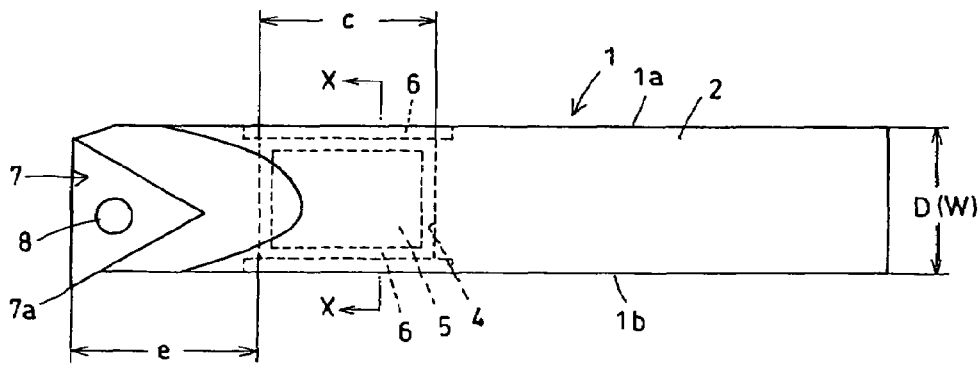
FIG. 6(a) is a plan view of a tool embodying the present invention.
Figure 6B:
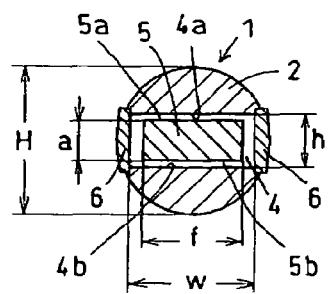
FIG. 6(b) is a sectional view taken along line X-X of FIG. 6(a)

First, the vibration suppressing tool shown in FIG. 6 is a boring tool which includes a holder 1. A throwaway insert 7 is detachably clamped to the front end of the holder 1 by a clamp means 8. A hole as a pocket 4 is formed in the shank 2 of the holder 1 by e.g. electrical discharge machining so as to extend through the shank 2 from one side thereof to the other side. The pocket 4 is located offset from the axial center of the holder 1 toward its front end. A rectangular parallelepiped vibration suppressing piece 5 made of cemented carbide having a specific gravity of 15.1 is received in the pocket 4. Both open ends of the pocket 4 are closed by lid members 6 to prevent the vibration suppressing pieces 5 from coming out of the pocket 4. The pocket 4 has a rectangular cross-section and includes walls 4a and 4b parallel to each other. The shank 2 of the holder 1 shown has a circular cross-section. But the present invention is applicable to a shank having a polygonal cross-section, too.

The vibration suppressing piece 5 has a height a and a width f that are about 0.15 mm smaller than the corresponding height and width of the pocket 4 and has flat surfaces 5a and 5b facing the walls 4a and 4b of the pocket 4 so as to be movable within the range determined by the clearance between the pocket 4 and the vibration suppressing piece 5.

According to the present invention, it is essential that the vibration suppressing piece 5 be movable in the pocket 4. If the vibration suppressing piece 5 interfered with the walls of the pocket 4 and were unable to move relative to the shank 2, it would be unable to suppress chattering of the tool. But if the vibration suppressing piece 4 were too small, it would be too lightweight to sufficiently suppress chattering. Based on experiments conducted by the present inventors, it was discovered that if the shank of the holder has a relatively small diameter D, i.e. less than 20 mm, chattering is suppressed effectively if the vibration suppressing piece 5 is smaller in height and width than the pocket 4 by less than about 0.5 mm but the clearance therebetween is large enough for the vibration suppressing piece 5 to be movable in the pocket 4. If the clearance between the vibration suppressing piece 5 and the pocket 4 is smaller than 0.01 mm, the vibration suppressing piece 5 may become immovable in the pocket due to thermal deformation of the holder 1 and/or the vibration suppressing piece 5. Thus, the clearance is preferably in the range of about 0.01 to 0.5 mm. Particularly good results are obtained if the vibration suppressing piece 5 is smaller in height and width than the pocket by about 0.1 to 0.3 mm. But if the shank has a diameter D that is greater than 20 mm, even if the above clearance is large, i.e. the vibration suppressing piece 5 is smaller than the pocket 4 by more than 0.5 mm, the vibration suppressing piece 5 is still sufficiently large and heavyweight, so that it can effectively suppress chattering.

If the holder 1 is made of steel, the vibration suppressing piece 5 is preferably made of a material having a specific gravity greater than 7.8, which is the specific gravity of steel. Preferably, the vibration suppressing piece 5 has as large a specific gravity as possible, because by using a vibration suppressing piece having a larger specific gravity, it is possible to effectively suppress chattering without increasing the size of the pocket. Practically, the vibration suppressing piece is preferably made of cemented carbide having a specific gravity of 14 to 16 or a heavy metal having a specific gravity of about 18, because these materials are easily available and are easy to machine. Of course, the vibration suppressing piece may be made of a material having a larger specific gravity if such a material is easily available.

Too large a pocket 4 would reduce the rigidity of the holder 1, thereby deteriorating the accuracy of finishing (such as dimensional accuracy or surface roughness) of the tool, or might increase, rather than suppress, chattering. If the pocket 4 is too small, the vibration suppressing piece 5 has to be also correspondingly small, which makes it difficult to effectively suppress chattering. It is especially difficult to form a pocket having a small height h, because to form such a pocket, it is necessary to use a tool such as an end mill having a small diameter.

Taking these factors into consideration, the pocket 4 has preferably a width w that is 20 to 100% of the diameter D or width W of the shank, and a height h that is 5 to 70% of the diameter D or height H of the shank. When other factors are further taken into consideration, such as the effect of suppressing chattering, deterioration in machining accuracy resulting from deflection of the holder during machining, and how easy the tool can be manufactured, if the shank has a relatively small diameter, i.e. D=not more than 20 mm, the pocket has preferably a width w that is 50 to 100%, more preferably 70 to 95%, of the diameter D or width W of the shank, and a height h that is 20 to 40%, more preferably 20 to 30%, of the diameter D or height H of the shank.

Good results were obtained when the length c of the pocket 4 and the distance e between the front end of the tool and the pocket were both 50 to 250% of the diameter D of the shank. In the case of a boring tool, especially good results were obtained when the length c of the pocket 4 was about 100 to 150% of the diameter D of the shank, and the distance e between the cutting edge and the pocket was about 150 to 220% of the diameter D of the shank. If the diameter D of the shank is greater than 20 mm, even if the pocket is relatively small, vibration suppressing effects are obtainable. That is, even if the pocket 4 has a width w that is about 50% of the diameter D of the shank, good results are obtainable.

Figure 7A:
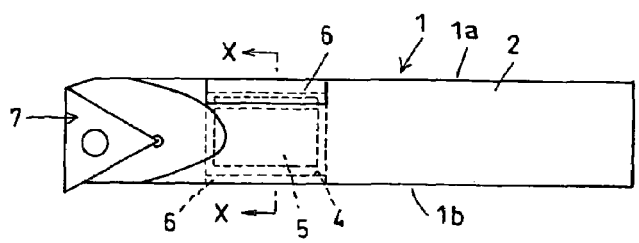
FIG. 7(a) is a plan view of the tool of FIG. 6 in which the pocket is inclined by θ°.
Figure 7B:
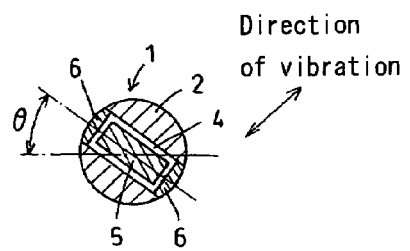
FIG. 7(b) is a sectional view of the tool of FIG. 6 in which the pocket is inclined by θ°.
Figure 8A:
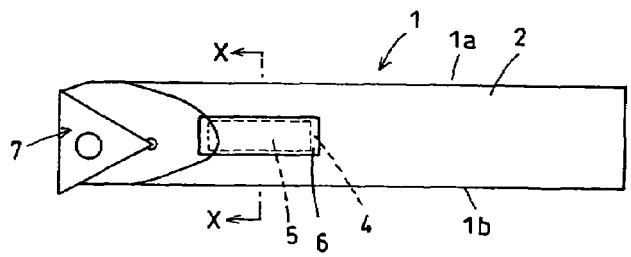
FIG. 8(a) is a plan view of the tool of FIG. 6 in which the pocket is inclined by θ=90°.
Figure 8B:
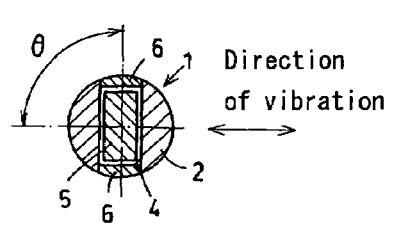
FIG. 8(b) is a sectional view of the tool of FIG. 6 in which the pocket is inclined by θ=90°.

The inclination angle θ shown in FIG. 7 should be determined according to the direction in which the cutting force acts. For ordinary inner diameter cutting tools, chattering can be suppressed sufficiently by orienting the pocket 4 such that its walls 4a and 4b extend horizontally. If cutting is always performed under the same conditions, good results will be obtained by orienting the pocket 4 such that its inner walls 4a and 4b are inclined within the range of 0 to 45 degrees with respect to a horizontal surface so as to be perpendicular to the direction of the resultant of the main component and thrust component of the cutting force, and inserting the vibration suppressing piece in this pocket. For special machining in which the thrust component is extremely large, it is conceivable to vertically orient the pocket 4 as shown in FIG. 8. But for ordinary inner diameter cutting tools, such a vertically oriented pocket has little effect in suppressing chattering.

Embodiment 2

Figure 9A:
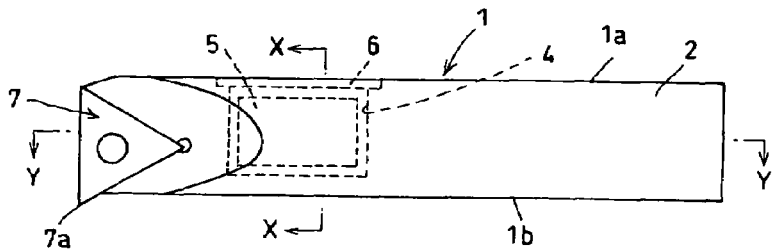
FIG. 9(a) is a plan view of a tool of another embodiment.
Figure 9B:
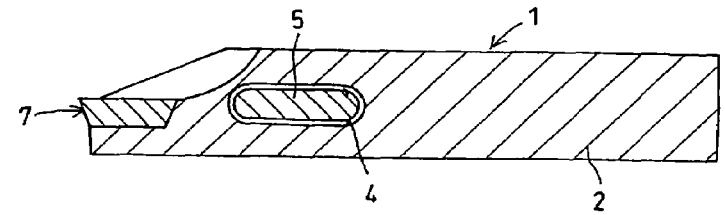
FIG. 9(b) is a sectional view taken along line X-X of FIG. 9(a)
Figure 9C:
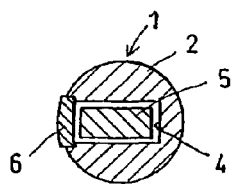
FIG. 9(c) is a sectional view taken along line Y-Y of FIG. 9(a)

This embodiment, shown in FIG. 9, is preferable when higher machining accuracy is required. While the tool of FIG. 6 can more effectively suppress chattering by increasing the size of the vibration suppressing piece 5, the shank tends to be low in rigidity because the pocket 4 extends through the shank, so that the machining accuracy tends to be low. The vibration suppressing cutting tool of FIG. 9 is free of this problem.

The pocket 4 of the vibration suppressing cutting tool of FIG. 9 is formed by an end mill from a side 1a of the shank that is opposite to the side 1b of the shank where the cutting edge 7a is located. Complementary to the contour of the end mill, the pocket 4 has arcuate surfaces at both ends thereof. In order to keep high rigidity of the holder 1, the pocket 4 is a blind hole having a closed end wall having a thickness of about 2 mm on the side 1b of the shank where the cutting edge 7a is located. The opening of the pocket 4 on the side 1a is closed by a lid 6 in the same manner as in Example 1 to prevent the vibration suppressing piece 5 from coming out of the pocket 4. The lid 6 may be made of the same material as the material forming the holder 1. But preferably, the lid 6 is made of cemented carbide and strongly bonded to the holder 1 to minimize the reduction in rigidity of the holder due to the provision of the pocket.

The fact that the vibration suppressing tool of FIG. 9 has a blind hole as the pocket 4 is practically important. The inventors of the invention actually manufactured tools as shown in FIG. 6. It was confirmed that chattering was suppressed in these tools very efficiently. However, in these tools, lowering of the rigidity of the holder is unavoidable, which may detrimentally affect the machining accuracy.

Figure 1A:
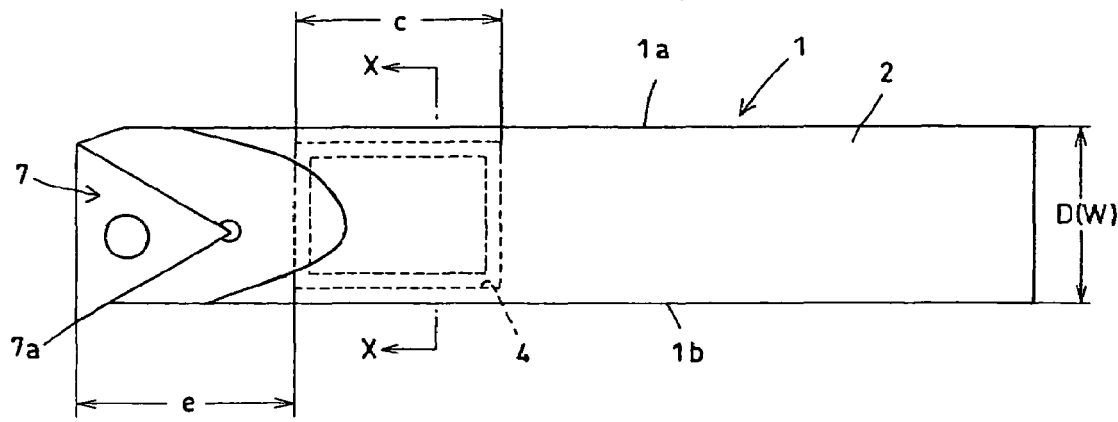
FIG. 1(a) is a plan view of a tool according to the present invention.

Accordingly, several differently shaped tool samples, including one having the shape of H beams that are widely used as building materials, were tested for their rigidity. The results are shown in FIG. 10. In columns A to D of FIG. 10, the sections of the shanks of the respective tool samples taken along line X-X of FIG. 1(a) are shown. As is apparent from FIG. 10, the tool sample of FIG. 6 (shown in column A of FIG. 10), which is formed with a through hole as the pocket 4, was about 40% greater in the amount of deformation under loads than conventional inner diameter cutting tools having a steel shank including no vibration suppressing arrangement. In contrast, the tool sample of FIG. 9 (shown in column B of FIG. 10) was only about 9% greater in the amount of deformation under loads than the conventional tool. This means that in the tool sample of FIG. 9, lowering of the rigidity of the holder due to the provision of the pocket is kept to a minimum, so that the machining accuracy is kept stable. As is apparent from FIG. 10, this advantage is not found in any of the other tool samples.

In the arrangement of FIG. 9, by forming the lid 6 from cemented carbide and strongly joining such a lid 6 to the shank, it is possible to increase the rigidity of the shank to a level substantially equal to the rigidity of a conventional steel shank having no pocket.

The vibration suppressing piece 5 to be inserted in the pocket 4 having arcuate surfaces at both ends as seen from one side of the tool may be a rectangular parallelepiped member as shown in FIG. 13. If such a vibration suppressing piece 5 is sufficiently heavy in spite of the fact that its both ends are flat, the vibration suppressing piece 5 is preferably a rectangular parallelepiped member as shown in FIG. 13 because such a member has no arcuate surfaces at both ends thereof and thus can be formed easily.

Figure 1B:
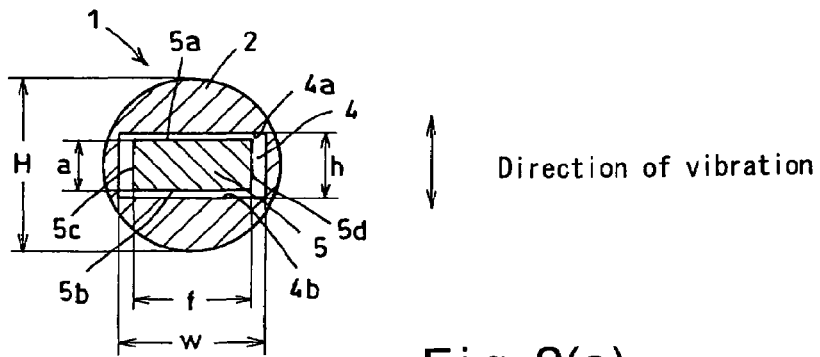
FIG. 1(b) is a sectional view taken along line X-X of FIG. 1(a)
Figure 2A:
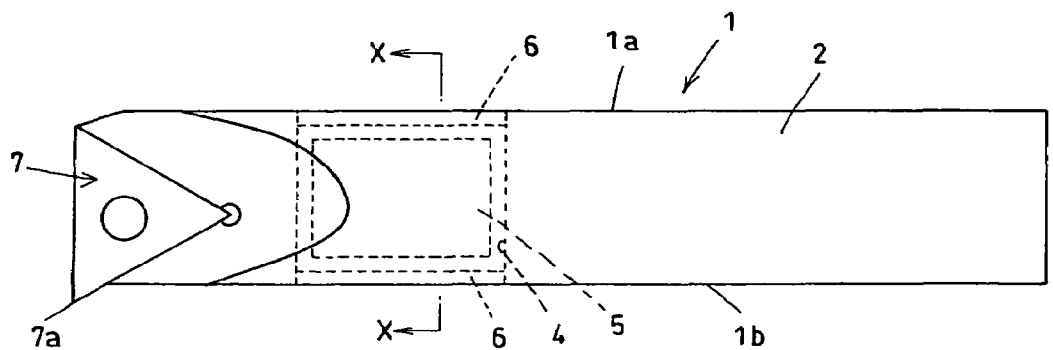
FIG. 2(a) is a plan view of another tool according to the present invention.
Figure 2B:
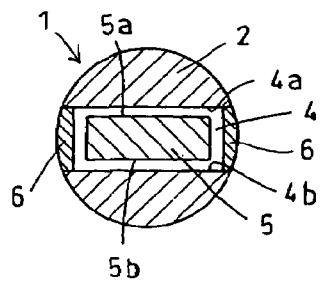
FIG. 2(b) is a sectional view taken along line X-X of FIG. 2(a)
Figure 3A:
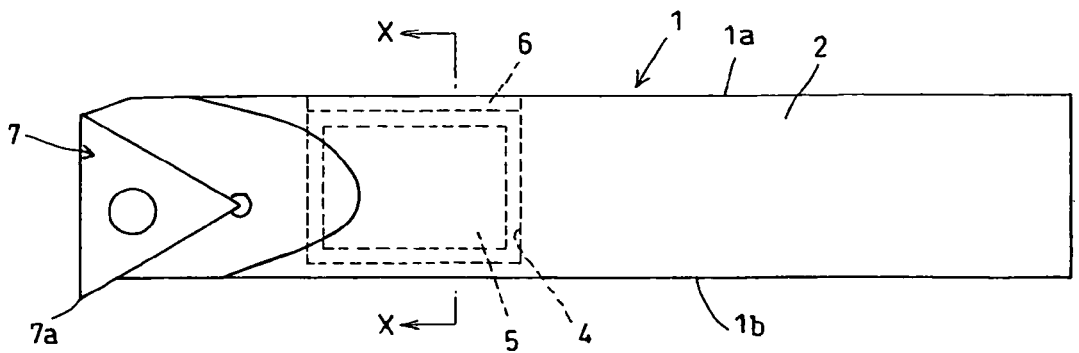
FIG. 3(a) is a plan view of still another tool according to the present invention.
Figure 3B:
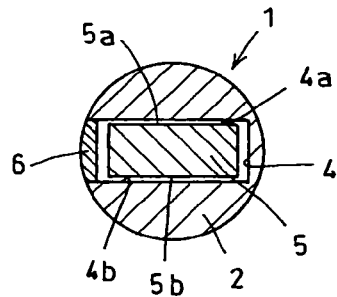
FIG. 3(b) is a sectional view taken along line X-X of FIG. 3(a)
Figure 4A:
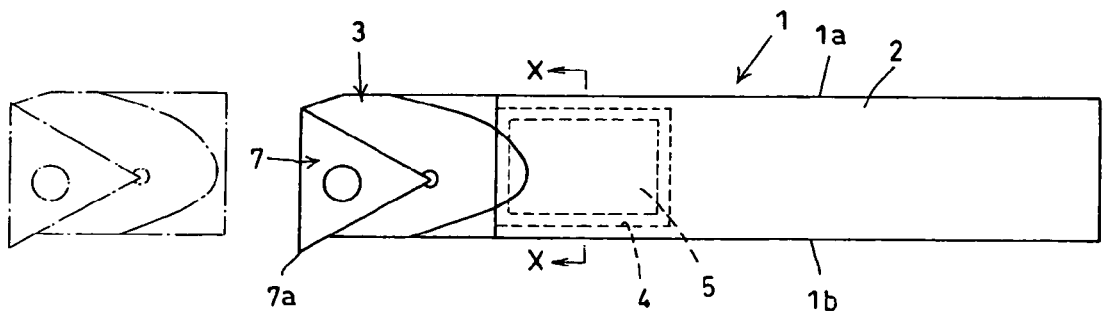
FIG. 4(a) is a plan view of yet another tool according to the present invention.
Figure 4B:
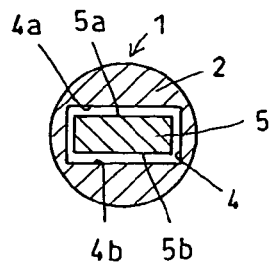
FIG. 4(b) is a sectional view taken along line X-X of FIG. 4(a)
Figure 5A:
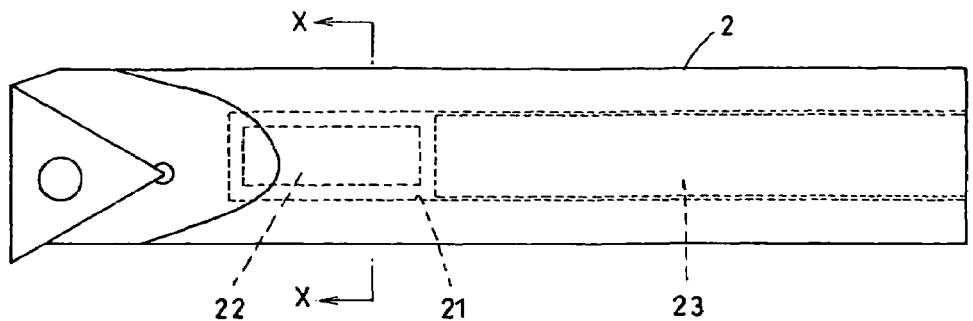
FIG. 5(a) is a plan view of a conventional vibration suppressing tool, showing its basic structure.
Figure 5B:
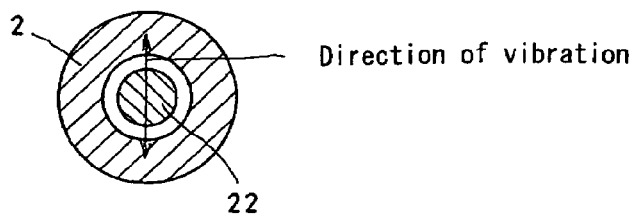
FIG. 5(b) is a sectional view taken along line X-X of FIG. 5(a)

In order to determine how effectively tools according to the present invention can suppress chattering, tool samples each including a holder having the shape under S12M-STUPR1103 of ISO were prepared and subjected to a cutting experiment. The tool samples each included a shank having a diameter D of 12 mm and formed with a pocket spaced apart from the front end of the tool by a distance e of 21 mm and having a length c of 15 mm, a width w of 8 mm and a height h of 3 mm. The value (w−f) in FIG. 1 was 0.1 mm, and the value t in FIG. 10 was 2 mm.

The tool samples subjected to the experiment comprised Examples 1 to 6 of the invention and Comparative Examples 1 to 5 shown in FIG. 11. Examples 1 to 6 of the invention and Comparative Examples 1 and 3 differ from each other in the height and width of the pocket, and the size and material of the vibration suppressing piece. In Comparative Example 2, the clearance between the vibration suppressing piece and the pocket is zero. The holder of Comparative Example 4 comprises a conventional steel shank. The shank of Comparative Example 5 is made of cemented carbide. The shanks of all the examples other than Comparative Example 5 are made of steel.

In the cutting experiment, workpieces of ordinary alloy steel SCR420 were cut with a cutting speed of 80 m/min, a depth of cut of 0.2 mm and a feed rate of 0.1 mm/rev, while changing the protruding amount from the tool holder (protruding amount=48 mm, 60 mm, 72 mm and 84 mm). During cutting, each tool sample was observed for any sign of chattering.

FIG. 12 shows the results of the experiment, in which the symbol ○ indicates that the tool sample suffered no chattering, and the symbol X indicates that the tool sample suffered chattering. As will be apparent from these results, chattering was sufficiently suppressed in any of Examples of the invention. Particularly in Examples 1, 3 and 5 of the invention, chattering was more effectively suppressed than in Comparative Example 5, of which the holder was made of cemented carbide.

Examples of the invention were also compared with commercially available vibration suppressing boring tools made by several manufacturers for their ability to suppress chattering. When workpieces were cut using the respective tool samples under the same conditions, the commercially available tools all produced noise (metallic sounds) resulting from chattering during cutting. Examples of the invention also produced slight noise in the initial stage of cutting according to the cutting conditions, but such noise soon subsided. Thus, cutting was performed practically silently thereafter. Under other conditions, examples of the invention produced no noise at all from the beginning to end of cutting, so that it was sometimes even impossible to determine whether cutting was being performed.

Embodiment 3

Figure 14A:
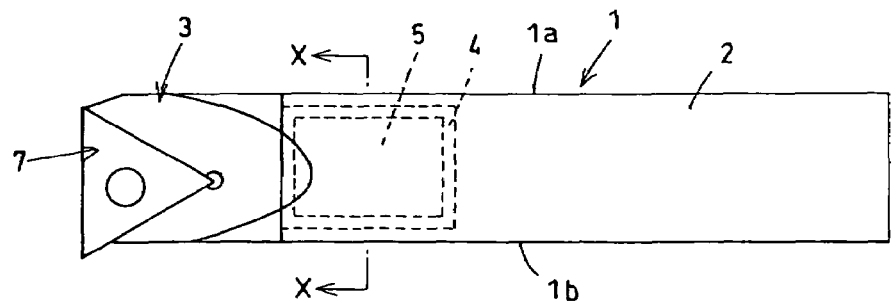
FIG. 14(a) is a plan view of a tool of another embodiment.
Figure 14B:
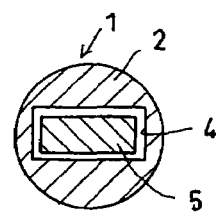
FIG. 14(b) is a sectional view taken along line X-X of FIG. 14(a)

FIG. 14 shows still another embodiment. The holder 1 of the vibration suppressing cutting tool of FIG. 14 comprises a shank 2 and a head 3 that are formed separately from each other and joined together. The head 3 may be undetachably joined to the shank 2, or may be detachably connected to the shank 2 so that only the head 3 is replaceable if the head 3 is broken.

In this embodiment, the pocket 4 opens at the front end of the shank 2. By joining the head 3 to the shank 2 with the vibration suppressing piece 5 received in the pocket 4, the head 5 serves as a lid for closing the opening of the pocket 4. This eliminates the need for a separate lid. If the pocket 4 is formed by electrical discharge machining, the shank 2 can be made of cemented carbide, so that it is possible to increase the rigidity of the tool and thus dramatically suppress chattering.

Embodiment 4

Figure 15A:
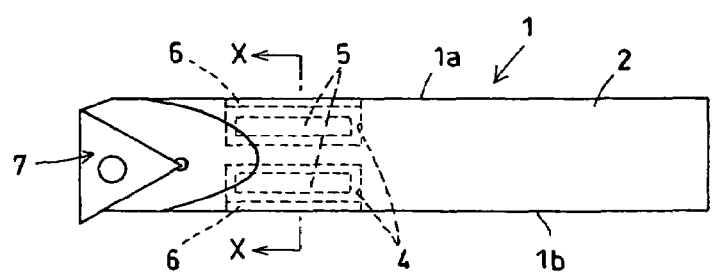
FIG. 15(a) is a plan view of a tool of still another embodiment.
Figure 15B:
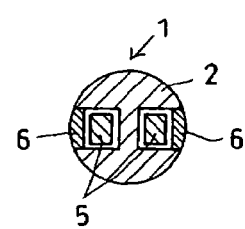
FIG. 15(b) is a sectional view taken along line X-X of FIG. 15(a)

As shown in FIG. 15, the holder of this embodiment is formed with two pockets 4 each formed from one side of the holder 1 and separated from each other by a central wall. In this arrangement, only small vibration suppressing pieces 5 can be used, so that the ability to suppress chattering slightly deteriorates. But with this arrangement, it is possible to supply cutting oil to the cutting edge through an axial oil supply hole formed in the central wall separating the two pockets.

Embodiment 5

Figure 16:
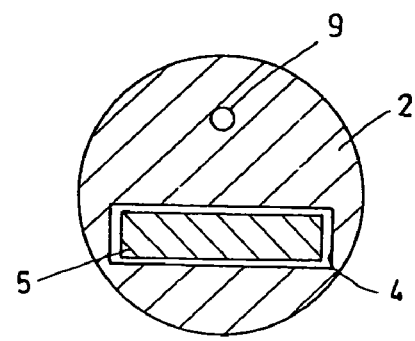
FIG. 16 is a sectional view of an example in which the pocket is displaced from the axis of the shank.

The vibration suppressing cutting tool of FIG. 16 has its pocket 4 displaced downwardly (or upwardly) from the central axis of the shank 2. In this embodiment, too, an oil supply hole 9 can be formed in the shank at its portion over the pocket 4.

Embodiment 6

Figure 17A:
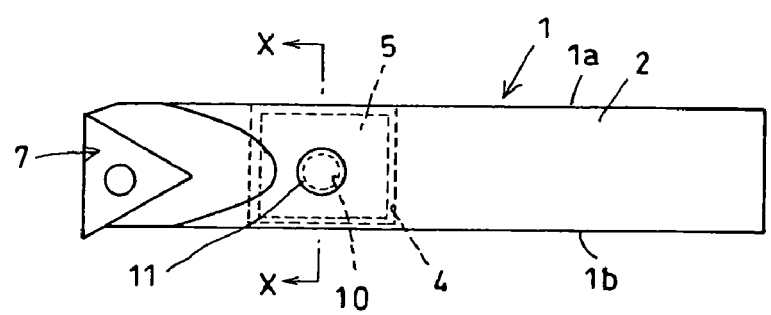
FIG. 17(a) is a plan view of a tool of still another embodiment.
Figure 17B:
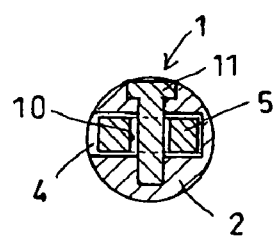
FIG. 17(b) is a sectional view taken along line X-X of FIG. 17(a)

FIG. 17 shows a different means for preventing the vibration suppressing piece 5 from coming out of the pocket 4. As shown, the vibration suppressing piece 5 is formed with a vertical through hole 10 through which a set pin 11 or the like having a smaller diameter than the through hole 10 extends to prevent the vibration suppressing piece from coming out of the pocket 4 without the need for a lid.

Embodiment 7

Figure 18A:
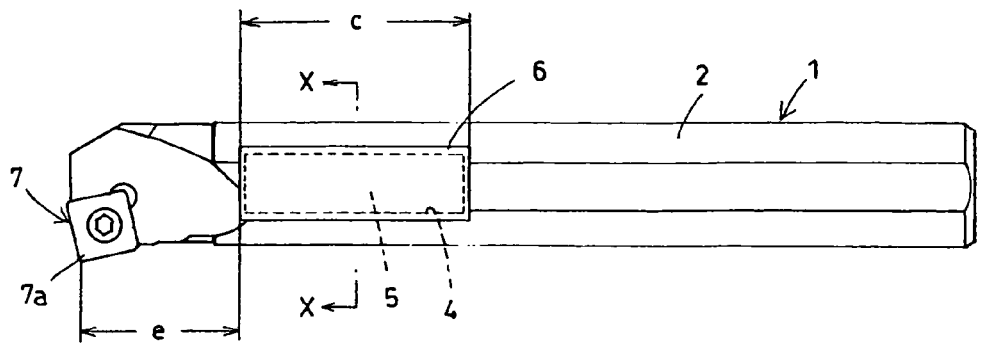
FIG. 18(a) is a plan view of a tool of yet another embodiment.
Figure 18B:
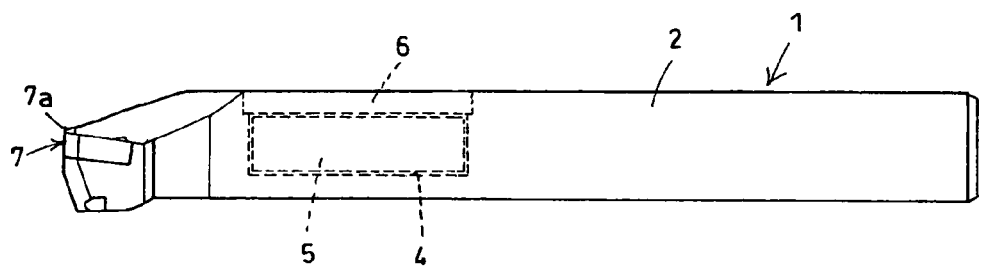
FIG. 18(b) is a side view of the tool of FIG. 18(a)
Figure 18C:
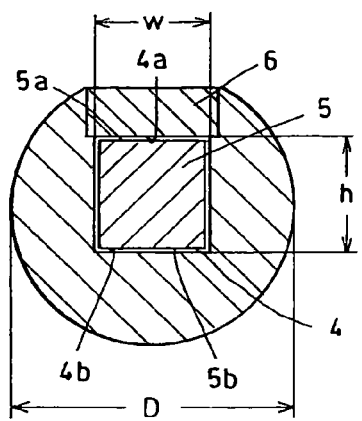
FIG. 18(c) is a sectional view taken along line X-X of FIG. 18(a)

FIG. 18 shows a vibration suppressing cutting tool of still another embodiment according to the present invention. The tool shown is a boring tool in which the pocket 4 formed in the shank 2 of the holder 1 has a width w and a height h which are both 20 to 50% of the diameter D of the shank. But the tool of this embodiment is not limited to a boring tool, and the dimensions of the pocket are not limited to the above ranges, either. The pocket 4 need not be formed from one side of the shank but may be formed from top (or bottom) of the shank 2 as shown in FIG. 18. The vibration suppressing piece 5 is received in the pocket 4, and the opening of the pocket 4 is closed by a lid 6. The lid 6 is preferably made of cemented carbide to minimize the reduction of the rigidity of the steel shank due to the presence of the pocket.

Figure 19A:
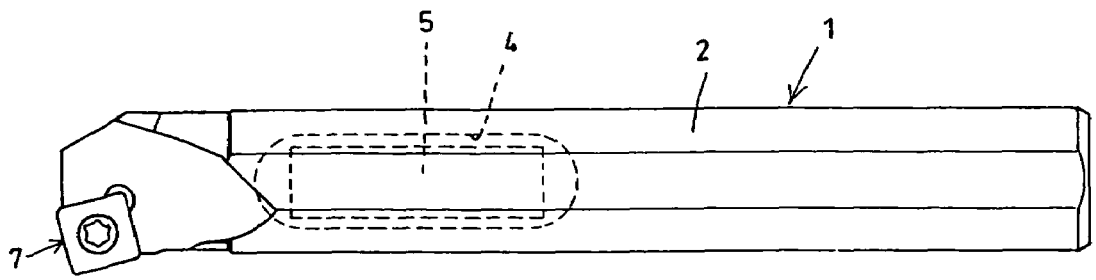
FIG. 19 is a plan view of different pockets and vibration suppressing pieces.
Figure 19B:
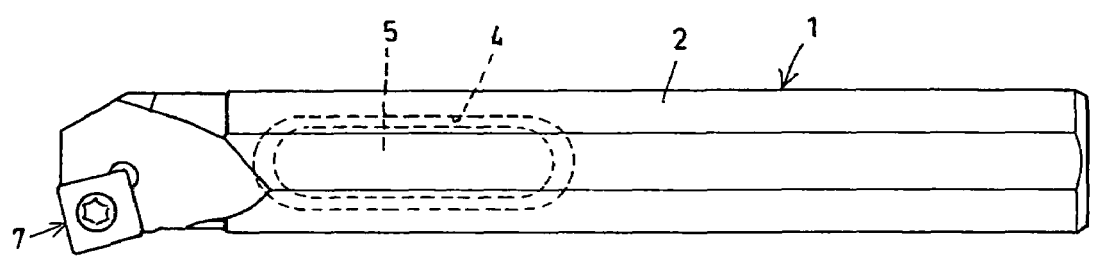
Figure 19C:
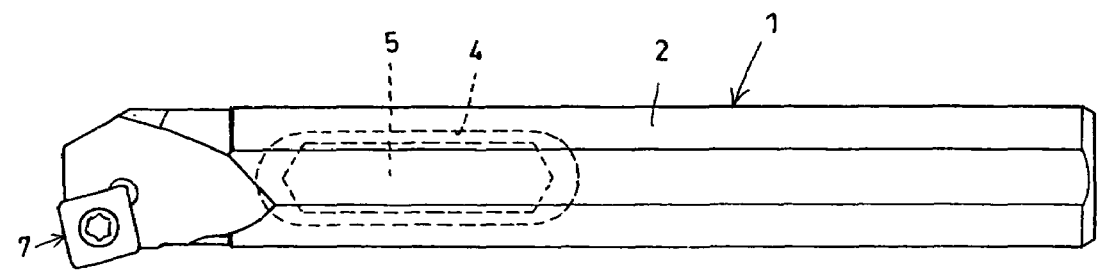

A pocket 4 formed by an end mill has arcuate front and rear ends as shown in FIG. 19. The vibration suppressing piece 5 may have correspondingly arcuate longitudinal ends as shown in FIG. 19(b), or triangular longitudinal ends as shown in FIG. 19(c) to maximize the weight of the vibration suppressing piece. But the vibration suppressing piece may have flat longitudinal end surfaces that are perpendicular to the axis of the tool as shown in FIG. 19(a).

Figure 20A:
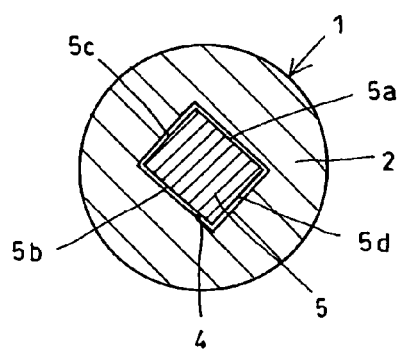
FIG. 20 is a sectional view of differently positioned pockets.

The vibration suppressing piece 5 (and thus the pocket 4) is preferably oriented such that its surfaces 5a and 5b are perpendicular to the direction of the cutting force. Thus, the surfaces 5a and 5b are not necessarily horizontal but may be inclined as shown in FIG. 20(a).

The vibration suppressing piece 5 does not have to be necessarily square. If the surfaces 5a and 5b, which are oriented so as to be perpendicular to the direction of the cutting force, have a greater area than the surfaces 5c and 5d, which are perpendicular to the surfaces 5a and 5b, vibrations can be more effectively damped. The vibration suppressing piece 5 may be divided into a plurality of subpieces. Even in this case, it can sufficiently damp vibration.

Figure 20B:
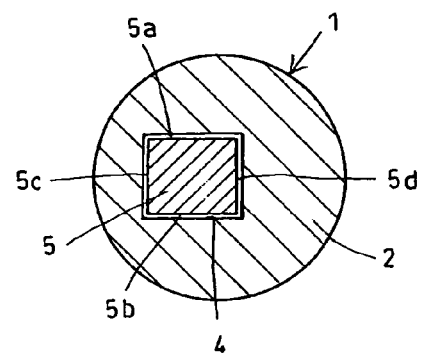

The pocket 4 may be displaced from the center of the shank as shown in FIG. 20(b). Such a pocket 4 may be formed more easily and thus at a lower cost. Also, with this arrangement, since the vibration suppressing piece 5 knocks against the wall surfaces of the pocket 5 at positions displaced from the center of the shank, it applies torsional force to the shank. Thus, if the shank is subjected to torsional vibration, this vibration suppressing piece can effectively damp such vibration.

Description is now made of the results of a test conducted to confirm the vibration suppressing ability of the tool of Embodiment 7. In the test, Examples 1 and 2 of the invention and Comparative Examples 1 to 3 were used. Examples 1 and 2 of the invention and Comparative Examples 1 and 2 each include a shank of S16RSSKPR09 under ISO (16 mm in diameter) which is formed with a pocket of the size shown in FIG. 21 (its center of gravity is on the center of the shank) in which is received a vibration suppressing piece made of a heavy metal having a specific gravity of 18.1 and having a width and a height that are both smaller by 0.3 mm than the width and height of the pocket, respectively. Comparative Example 3 includes a steel shank having no pocket. Using these tool samples, workpieces were cut under the following conditions 1 and 2. In any of Examples 1 and 2 of the invention, and Comparative Examples 1 and 2, the distance e from the cutting edge to the pocket is 25 mm, and the pocket has a length c of 20 mm.

| Cutting conditions 1 | |
| --- | --- |
| Insert used: | ISO SPMT090304N (with molded chip breaker) |
| Protrusion of the holder: | 80 mm |
| Workpiece: | SCM415 |
| Cutting speed: | V = 120 m/min |
| Feed rate: | f = 0.15 mm/rev |
| Depth of cut: | d = 0.5 mm/rev |
| Cutting fluid: | Water-insoluble cutting oil |
| Cutting conditions 2 | |
| Insert used: | ISO SPMT090304N (with molded chip breaker) |
| Protrusion of the holder: | 80 mm |
| Workpiece: | SUJ2 |
| Cutting speed: | V = 120 m/min |
| Feed rate: | f = 0.1 mm/rev |
| Depth of cut: | d = 0.5 mm/rev |
| Cutting fluid: | Water-insoluble cutting oil |

The test results are shown in FIG. 21. The symbols ○ and X indicate that the respective tools suffered no chattering and suffered chattering, respectively. For Examples 1 and 2 of the invention, good results were obtained both under the cutting conditions 1, which are the cutting conditions when cutting ordinary carbon steel and under the cutting conditions 2, which are the finish cutting conditions when the workpiece has high hardness. Thus, Examples 1 and 2 of the invention can suppress chattering under any conditions.

In contrast, for Comparative Examples 1, the results were bad both under the cutting conditions 1 and 2. This is presumably because the vibration suppressing piece was too lightweight. For Comparative Example 2, good results were obtained under the cutting conditions 1 but not under the cutting conditions 2, in which the thrust component is large. For Comparative Example 3, no vibration suppressing effect was observed at all, so that the results were bad both under the cutting conditions 1 and 2.

Embodiment 8

Figure 22A:
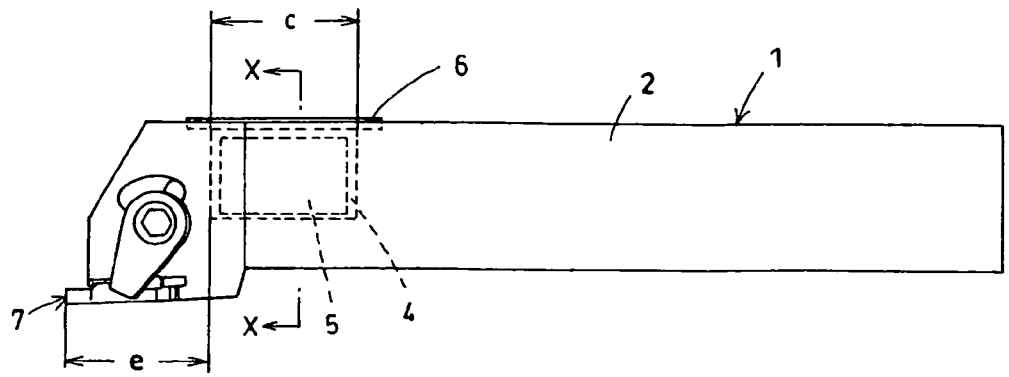
FIG. 22(a) is a plan view of a tool of another embodiment.
Figure 22B:
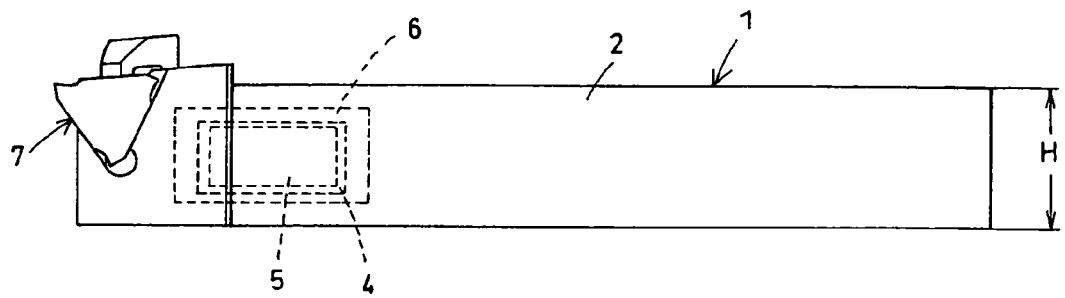
FIG. 22(b) is a side view of the tool of FIG. 22(a)
Figure 22C:
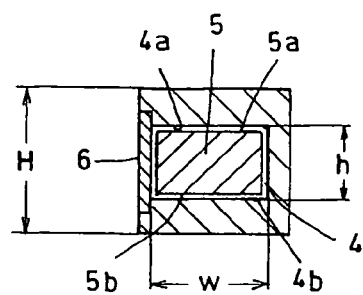
FIG. 22(c) is a sectional view taken along line X-X of FIG. 22(a)
Figure 23A:
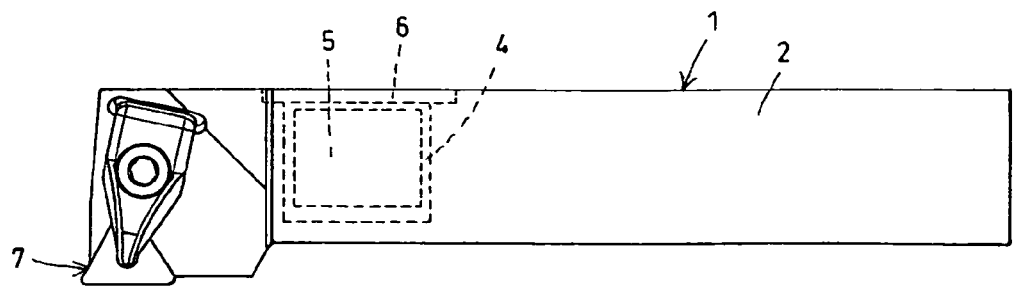
FIG. 23(a) is a plan view of a tool of still another embodiment.
Figure 23B:
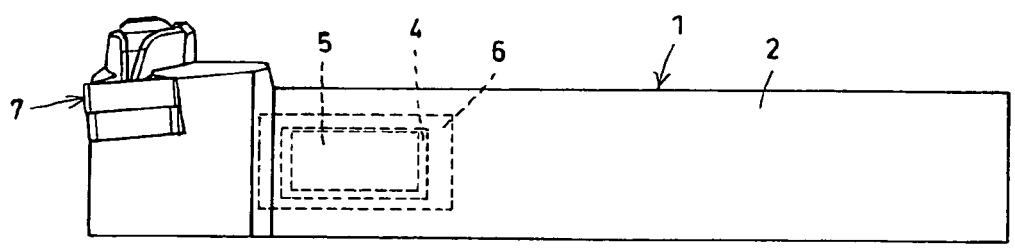
FIG. 23(b) is a side view of the tool of FIG. 23(a)
Figure 24A:
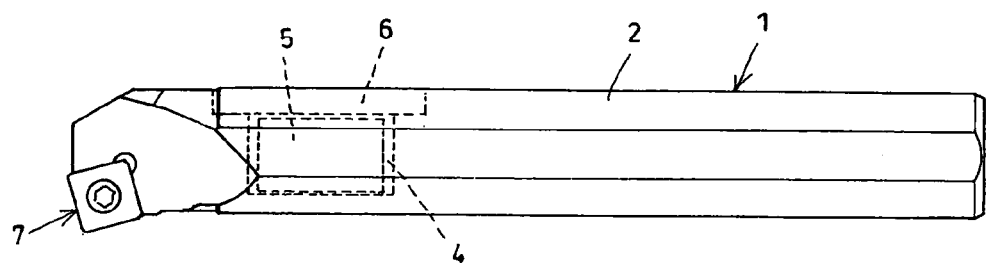
FIG. 24(a) is a plan view of a tool of yet another embodiment.
Figure 24B:
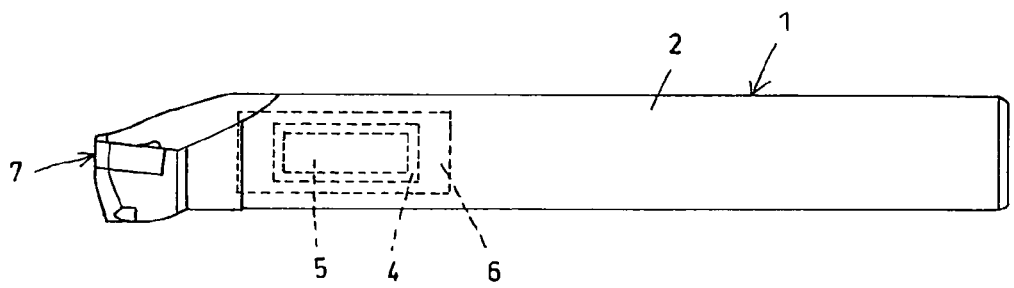
FIG. 24(b) is a side view of the tool of FIG. 24(a)

FIG. 22 shows a grooving tool to which the concept of the present invention is applied. FIGS. 23 and 24 show outer diameter cutting tools to which the concept of the present invention is applied. Unlike inner diameter cutting tools, dimensions of these tools are not restricted, so that even if the pocket is large, it is possible to keep high rigidity of the shank by increasing the size of the shank.

Negative inserts are mainly used for outer diameter cutting tools. In this case, the cutting resistance tends to be high, so that high vibration energy is produced. Thus, a vibration suppressing piece which can cancel such high vibration energy is required. Also in this case, the pocket 4 preferably has the same width as the tool of FIG. 6 (i.e. 50 to 100% of the width W of the shank) and an increased height h, i.e. 40 to 70% of the height H (or diameter D) of the shank. If the size of the shank is not restricted, it is possible to form a pocket having the abovementioned dimensions.

FIG. 25 shows the results of a test conducted to confirm the vibration suppressing ability of the tool of Embodiment 8. While forming grooves in workpieces using grooving tools, vibration energy that is as large as the energy produced during outer diameter cutting is produced. Thus, in the test, how chattering was damped was examined when grooves were formed in workpieces using grooving tools as shown in FIG. 22.

For the test, Examples 1 and 2 of the invention and Comparative Examples 1 to 4 were prepared. Examples 1 and 2 of the invention and Comparative Examples 1 to 3 each include a holder having a steel shank (25×25 mm) formed with a pocket of the size shown in FIG. 25 in which is inserted a vibration suppressing piece smaller in size by 0.2 mm than the pocket and made of a heavy metal having a specific gravity of 18.1, and a triangular grooving insert (width of the cutting edge: 3 mm) made of K10-PVD-coated cemented carbide and mounted on the holder so as to be used in a vertical position with respect to the workpiece. Comparative Example 4 has a steel shank with no pocket. Cutting was performed using these tool samples under the following cutting conditions. In any of Examples 1 and 2 of the invention, and Comparative Examples 1 to 3, the distance e from the cutting edge to the pocket is 15 mm, and the pocket has a length c of 30 mm.

| Cutting conditions 1 | |
|---|---|
| Workpiece: | S45C |
| Cutting speed: | V = 100 m/min |
| Feed rate: | f = 0.05 mm/rev |
| Cutting fluid: | Water-insoluble cutting oil |
| Cutting conditions 2 | |
| Workpiece: | S45C |
| Cutting speed: | V = 200 m/min |
| Feed rate: | f = 0.1 mm/rev |
| Cutting fluid: | Water-insoluble cutting oil |

As will be apparent from the test results shown in FIG. 25, Examples 1 and 2 of the invention were free of chattering both under the cutting conditions 1 and 2. In contrast, Comparative Example 1, in which the pocket excessively reduced the rigidity of the shank, produced as large chattering as was produced by Comparative Example 4. Comparative Examples 2 and 3 were effective during light cutting. But during heavy cutting, chattering was not suppressed sufficiently.

Embodiment 9

FIG. 26 shows a still different outer diameter cutting tool. During ordinary outer diameter cutting, large chattering accompanying squeaking sounds is less likely to be produced because it is possible to increase the rigidity of the shank. But silent minute chattering is produced, which could cause minute chipping of the cutting edge or peeling of the coating of a coated tool.

Such minute chattering can be suppressed by using a vibration suppressing piece that is smaller than those described and shown above. Thus, in the embodiment of FIG. 26, the pocket 4 has a width w that is 20 to 100% of the width W of the shank and a height h that is 5 to 20% of the height H of the shank, and the vibration suppressing piece 5 is sized such that there exists a clearance of 0.03 to 0.5 mm, more preferably 0.03 to 0.1 mm between the vibration suppressing piece 5 and the wall surfaces 4a and 4b of the pocket 4. The opening of the pocket 4 is closed by a lid 6 to prevent the vibration suppressing piece 5 from coming out of the pocket 4. The tool of FIG. 26 is advantageously used for high-speed machining of carbon steel and machining of stainless steel. The vibration suppressing piece 5 suppresses minute chattering, thus reducing the possibility of chipping of the cutting edge and improving the durability of the tool.

The shank 2 may comprise upper and lower halves. In this case, after forming the pocket and receiving the vibration suppressing piece in the pocket, the upper and lower halves are fixedly joined together by fitting, screwing, welding or any other suitable method. Thus, the lower half serves as a lid for the pocket.

In the case of boring tools, too, if the rigidity of the shank is increased, not large chattering but minute chattering may be produced. Thus, the pocket and the vibration suppressing piece of FIG. 26, which are used for an outer diameter cutting tool, can also be used for boring tools to suppress minute chattering. FIG. 27 shows such an embodiment.

FIG. 28 shows the results of a test conducted to confirm the vibration suppressing ability of the tool of Embodiment 9. For the test, Examples 1 and 2 of the invention and Comparative Examples 1 to 3 were prepared. Examples 1 and 2 of the invention and Comparative Examples 1 and 2 are tools of the type shown in FIG. 26 each having a 25 mm square steel shank formed with a pocket of the size shown in FIG. 28 in which is received a vibration suppressing piece 5 smaller in size by 0.2 mm than the pocket and made of a heavy metal having a specific gravity of 18.1. Comparative Example 3 has a steel shank with no pocket. Cutting was performed using these tool samples under the following cutting conditions. In any of Examples 1 and 2 of the invention and Comparative Examples 1 and 2, the distance e from the cutting edge to the pocket is 15 mm, and the pocket has a length c of 30 mm.

| Cutting conditions | |
|---|---|
| Workpiece: | SCM435 |
| Insert: | TNMG160412 (with molded chip breaker) |
| Cutting speed: | V = 300 m/min |
| Feed rate: | f = 0.25 mm/rev |
| Depth of cut: | 1.5 mm |
| Cutting fluid: | Water-insoluble cutting oil |

Cutting was performed discontinuously under these cutting conditions, and the number of impacts was measured until the cutting edge was broken. This test was conducted ten times. FIG. 28 shows the average thereof.

In the test, Comparative Examples 1 and 2 suffered minute chipping on the cutting edge, and accumulation of such minute chipping resulted in major breakage of the cutting edge. In contrast, Examples 1 and 2 of the invention were free of minute chipping and their cutting edges were broken due to wear. As will be apparent from these test results, according to the present invention, it is also possible to suppress minute chattering, which results in minute chipping.

Figure 29:
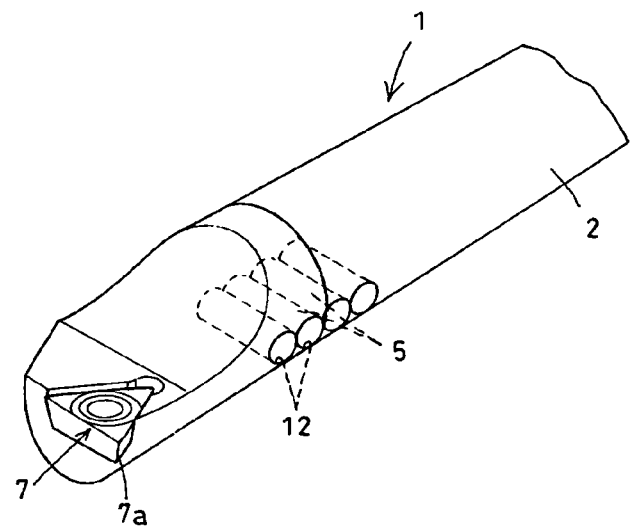
FIG. 29 is a perspective view of yet another embodiment.

The vibration suppressing cutting tool of FIG. 29 has a shank formed with a plurality of through holes (or blind holes) 12 provided near the front end thereof so as to extend in the width direction of the shank and be displaced from each other in the longitudinal direction of the shank. A plurality of vibration suppressing pieces 5 are each received in one of the holes 12 as pockets so as to be movable in the holes 12 but not to come out of the holes 12. In this arrangement, the vibration suppressing pieces 5 contact the holder along a plurality of lines, so that the vibration suppressing ability of this tool is even higher than that of existing vibration suppressing cutting tools provided with a damper. Because this cutting tool has the plurality of holes 12, the rigidity of the holder is higher than the holder with a single pocket. Preferably, the holes 12 are round holes, or the vibration suppressing pieces 5 are round bars so that the holder can be manufactured more easily at a lower cost.

Figure 30A:
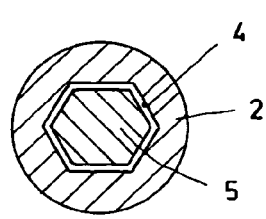
FIG. 30(a) is a view of another vibration suppressing piece having a different sectional shape.
Figure 30B:
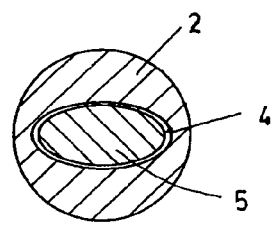
FIGS. 30(b) to 30(d) are views of other vibration suppressing pieces having different sectional shapes.
Figure 30C:
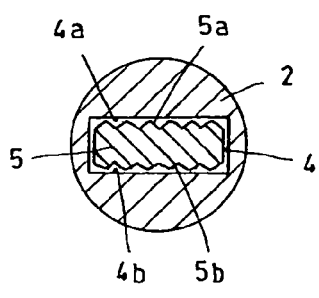
Figure 30D:
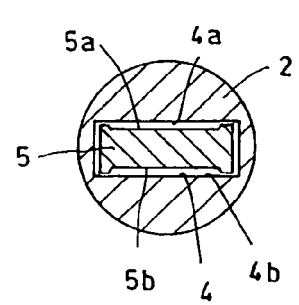

The vibration suppressing piece may have a rectangular cross-section (section perpendicular to the axis of the shank) so as to maximize the contact area with the wall surfaces 4a and 4b of the pocket. But instead, the pocket may have a polygonal cross-section as shown in FIG. 30(a) or an oval cross-section as shown in FIG. 30(b). Also, as shown in FIGS. 30(c) and 30(d), protrusions may be formed on the surfaces 5a and 5b so that the vibration suppressing piece 5 contact the wall surfaces 4a and 4b of the pocket along a plurality of lines or on a plurality of points.

Figure 31:
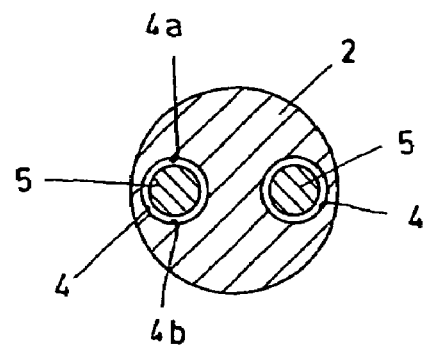
FIG. 31 is a sectional view of still another vibration suppressing piece.

In the arrangement of FIG. 31, a plurality of independent pockets 4 are formed in the shank 2 of the holder so as to be displaced from each other in the width direction of the shank, and a plurality of vibration suppressing pieces 5 are each received in one of the pockets 4. With this arrangement, too, the vibration suppressing pieces can be brought into contact with the wall surfaces 4a and 4b of the pockets along a plurality of lines, or along a plurality of surfaces.

Figure 32A:
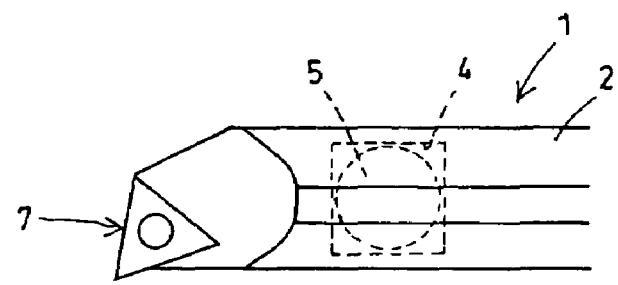
FIG. 32(a) is a view of a vibration suppressing piece having a different plan shape.
Figure 32B:
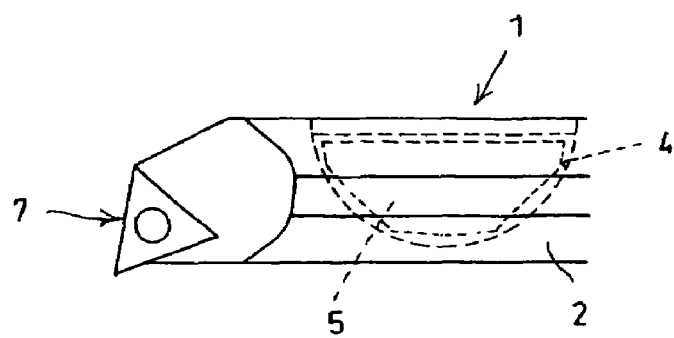
FIG. 32(b) is a view of another vibration suppressing piece having a still different plan shape.

The plan shape of the vibration suppressing piece 5 is not limited and may be square, rectangular, circular (see FIG. 32(a)), or substantially half-oval (see FIG. 32(b)). Even if the plan shape of the vibration suppressing piece is not rectangular, it can be formed so that its cross-section (section perpendicular to the axis of the shank) is rectangular.

This invention is applicable to inner diameter cutting tools, grooving tools, threading tools, ordinary outer diameter turning tools, and the like which tend to suffer chattering. This invention is also applicable to boring quills and drills not only for turning but to be mounted on milling machines and machining centers to effectively suppress chattering.

The vibration suppressing cutting tool according to this invention is mounted on known boring machines, outer diameter machining lathes, milling machines, machining centers, etc. By using the vibration suppressing cutting tool according to the present invention, it is possible to prevent a reduction in the yield due to poor machining and a reduction in productivity due to re-machining. Workpieces machined by the vibration suppressing cutting tool according to the present invention are free of chatter marks on their cut surfaces.

What is claimed is:

1. A vibration suppressing cutting tool comprising a holder having a shank formed with a pocket in which a vibration suppressing piece which is not coupled to said holder is received so as not to be able to come off said pocket, wherein at least portions of the inner wall of said pocket that knock against said vibration suppressing piece and portions of the surface of said vibration suppressing piece that knock against said inner wall of said pocket are flat surfaces, whereby said vibration suppressing piece knock against the inner wall of said pocket along surfaces or at a plurality of portions when the holder vibrates during cutting, and the flat surfaces extend in a direction substantially perpendicular to a direction of vibration of the holder during cutting, the vibration direction being substantially perpendicular to the longitudinal axis of the shank.

2. The vibration suppressing cutting tool of claim 1 wherein said portions of the inner wall of said pocket comprise first and second flat surfaces opposed to each other, and said portions of the surface of said vibration suppressing piece comprise third and fourth flat surfaces facing said first and second flat surfaces, respectively, with a clearance defined between said first and second surfaces and said vibration suppressing piece, said first, second, third and fourth flat surfaces extending in a direction substantially parallel to the longitudinal direction of the shank.

3. The vibration suppressing cutting tool of claim 1 wherein said pocket and said vibration suppressing piece have rectangular sections that are perpendicular to a central axis of said shank, said vibration suppressing piece having surfaces configured to abut a pair of opposed inner wall surfaces of said pocket and each having a greater area than other surfaces of said vibration suppressing piece.

4. The vibration suppressing cutting tool of claim 1 wherein between said vibration suppressing piece and a pair of opposed inner wall surfaces of said pocket, a clearance in the range of 0.01 to 0.5 mm is defined.

5. The vibration suppressing cutting tool of claim 1 wherein said pocket has a section perpendicular to a central axis of said shank and having a width w that is 20 to 100% of the diameter D or width W of said shank, and a height h, which is a distance between a pair of inner wall surfaces, said height h being 5 to 70% of the height H of said shank.

6. The vibration suppressing cutting tool of claim 1 wherein said pocket has an axial length c that is 50 to 250% of the diameter D or height H of said shank, and is displaced toward the front end of said tool.

7. The vibration suppressing cutting tool of claim 1 wherein said vibration suppressing piece is made of a material having a specific gravity that is equal to or greater than the specific gravity of the material forming said shank.

8. The vibration suppressing cutting tool of claim 1 wherein a pair of opposed inner wall surfaces of said pocket extend substantially perpendicular to the direction in which said holder vibrates during cutting.

9. The vibration suppressing cutting tool of claim 1 wherein said vibration suppressing piece comprises a plurality of separate subpieces received in a single pocket or each received in one of a plurality of independent pockets.

10. The vibration suppressing cutting tool of claim 1 wherein said pocket is formed from one side of said holder, said vibration suppressing cutting tool further comprising a piece holding means or sealing means for holding said vibration suppressing piece in said pocket.

11. The vibration suppressing cutting tool of claim 10 wherein said pocket is formed from one side of said holder opposite to the other side of the holder where a cutting edge is located, said pocket being a blind hole that does not reach said other side of said holder.

12. The vibration suppressing cutting tool of claim 1 herein said holder comprises a shank and a head that is a separate member from said shank, wherein said pocket is open to the front end of said shank, and wherein with said vibration suppressing piece received in said pocket, the opening of said pocket is closed with said head by joining said head to the front end of said shank.

* * * * *